United States Patent
Aschauer et al.

(10) Patent No.: US 11,914,715 B2
(45) Date of Patent: Feb. 27, 2024

(54) DEVICE UNIT SUITABLE FOR OPERATION IN A PROTECTED AND/OR OPEN OPERATING STATE AND ASSOCIATED METHOD

(71) Applicant: SIEMENS AKTIENGESELLSCHAFT, Munich (DE)

(72) Inventors: Hans Aschauer, Munich (DE); Steffen Fries, Baldham (DE); Markus Heintel, Munich (DE); Dominik Merli, Mertingen (DE); Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 766 days.

(21) Appl. No.: 16/466,869

(22) PCT Filed: Oct. 10, 2017

(86) PCT No.: PCT/EP2017/075719
§ 371 (c)(1),
(2) Date: Jun. 5, 2019

(87) PCT Pub. No.: WO2018/103915
PCT Pub. Date: Jun. 14, 2018

(65) Prior Publication Data
US 2020/0089890 A1    Mar. 19, 2020

(30) Foreign Application Priority Data
Dec. 8, 2016 (EP) ..................... 16202905

(51) Int. Cl.
*G06F 21/57* (2013.01)
*G06F 21/10* (2013.01)

(52) U.S. Cl.
CPC .......... *G06F 21/575* (2013.01); *G06F 21/572* (2013.01); *G06F 21/577* (2013.01); *G06F 21/107* (2023.08); *G06F 2221/2105* (2013.01)

(58) Field of Classification Search
CPC .... G06F 21/575; G06F 21/572; G06F 21/577; G06F 2221/0751; G06F 2221/2105
See application file for complete search history.

(56) References Cited

U.S. PATENT DOCUMENTS 8,806,579 B1 *  8/2014  Angus .................. G06F 9/5061
                                                    726/4
9,015,456 B1 *  4/2015  Spangler ............... G06F 9/4403
                                                    713/1
(Continued)

FOREIGN PATENT DOCUMENTS

CN          1716199 A       1/2006

OTHER PUBLICATIONS

Non-English International Search Report for application No. PCT/EP2017/075719 dated Jan. 2, 2018.

*Primary Examiner* — Jaweed A Abbaszadeh
*Assistant Examiner* — Hyun Soo Kim
(74) *Attorney, Agent, or Firm* — Schmeiser, Olsen & Watts LLP

(57) ABSTRACT

Provided is a device unit, including a module, which can configure the device unit with an operating state from among different operating states during the start-up process and/or during ongoing operation of the device unit, wherein a first protected operating state of the different operating states is designed to allow the execution of at least one operating process which can be predefined and to optionally protect the operating process by means of defined cryptographic means, wherein at least one second operating state of the different operating states is designed to deactivate the first protected operating state and to allow at least one other (Continued)

Figure 1:
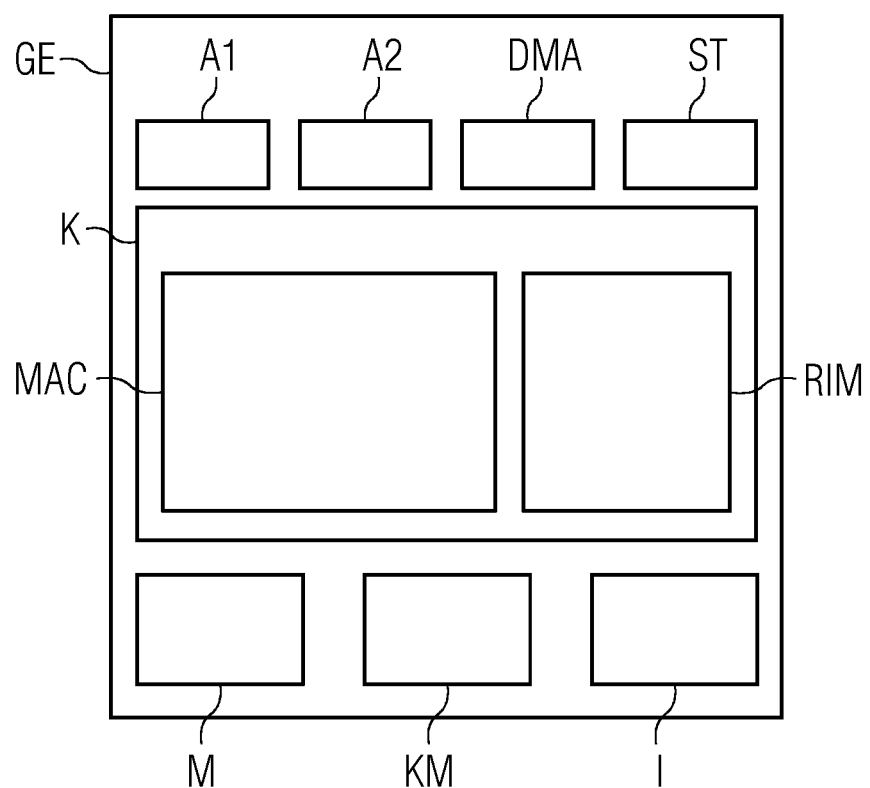

changeable operating process and to optionally protect the operating process by means of specifiable cryptographic means.

13 Claims, 2 Drawing Sheets

(56) References Cited

U.S. PATENT DOCUMENTS

| | | | |
|---|---|---|---|
| 10,140,454 B1* | 11/2018 | Spath | G06F 21/577 |
| 2006/0005034 A1 | 1/2006 | Willman et al. | |
| 2009/0013409 A1* | 1/2009 | Wenzinger | G06F 21/575 |
| | | | 726/24 |
| 2009/0172377 A1 | 7/2009 | Gueron et al. | |
| 2010/0185845 A1* | 7/2010 | Takayama | G06F 21/575 |
| | | | 713/2 |
| 2010/0268928 A1* | 10/2010 | Wang | G06F 12/0888 |
| | | | 713/2 |
| 2012/0173884 A1* | 7/2012 | Patil | G06F 21/6209 |
| | | | 713/189 |
| 2012/0204254 A1 | 8/2012 | Voss | |
| 2013/0031538 A1* | 1/2013 | Skalsky | G06F 21/572 |
| | | | 717/168 |
| 2013/0219507 A1 | 8/2013 | Chang et al. | |
| 2014/0068594 A1* | 3/2014 | Young | G06F 21/572 |
| | | | 717/172 |
| 2014/0122902 A1* | 5/2014 | Isozaki | G06F 21/78 |
| | | | 713/193 |

* cited by examiner

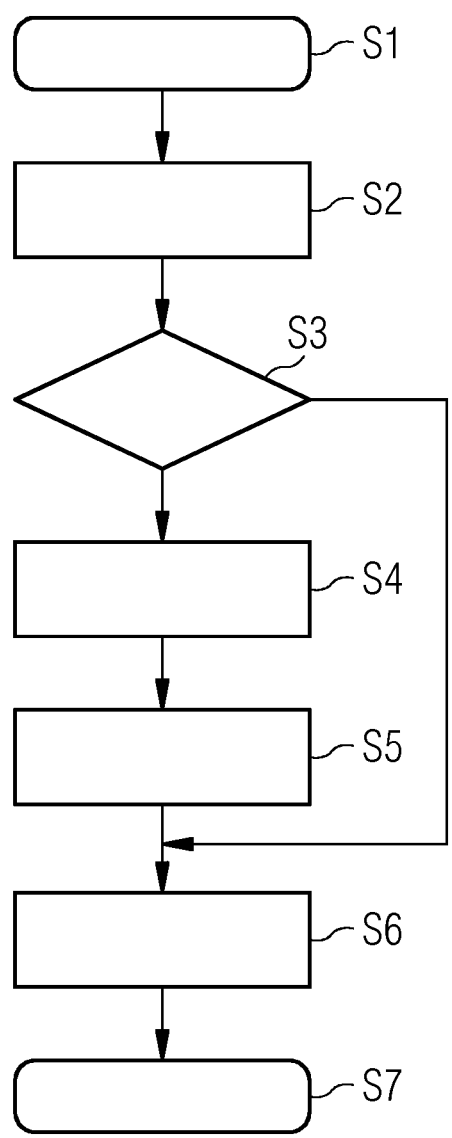

DEVICE UNIT SUITABLE FOR OPERATION IN A PROTECTED AND/OR OPEN OPERATING STATE AND ASSOCIATED METHOD

CROSS-REFERENCE TO RELATED APPLICATIONS

This application claims priority to PCT Application No. PCT/EP2017/075719, having a filing date of Oct. 10, 2017, which is based on European Application No. 16202905.2, having a filing date of Dec. 8, 2016, the entire contents both of which are hereby incorporated by reference.

FIELD OF TECHNOLOGY

The present embodiments of the invention relate to a device unit suitable for operation in a protected and/or open operating state, and to an associated method and to an associated computer program (product).

BACKGROUND

Embedded systems (or embedded devices) are often used in the environment of Industry 4.0, in the industrial Internet and in automation systems. In some cases, they may be based on similar hardware, such as workplace computers. However, they require boundary conditions that are generally very stringent, such as minimal costs and low space, power and memory consumption. Individual components such as processors and working memories are often based on the development of older components. This facilitates long-term usability and the procurement of spare parts. More recent embedded systems are often based on processor platforms that are highly integrated in relation to the periphery modules and consume considerably less power by virtue of modern power-saving techniques. In an embedded system, the software often has to meet real-time requirements. The software on such a device is called firmware. It is normally located on a ROM, but increasingly often on flash memories. Application-specific software is also referred to as application software or an application.

What is known as a boot loader loads the operating system and the application software when the system is booted. This furthermore offers the possibility of updating operating system and application software in the flash memory. Processors (CPUs) for embedded systems, such as for example Freescale/NXP i.MX6 or ti Sitara, FPGA-based system on chips such as Xilinx Zynq or Altera Cyclone V SoC or Intel Atom processors with UEFI support secure boot. Secure boot ensures that only authorized, unchanged software or firmware is executed. There is the requirement to protect the integrity of industrial controllers or embedded systems.

In the case of a PC-based system with UEFI-BIOS, there is the possibility of the verification keys for secure boot being able to be reset by an authorized user. On embedded platforms, in which the keys are burned into what are known as fuses (burnable fuses), however, this is impossible. This UEFI-BIOS variant also has the disadvantage that the security level of secure boot depends substantially on the security of the BIOS password. This results in a high expenditure to keep the BIOS password secure. In particular, a user having access to BIOS configuration settings is also able to change the secure boot configuration.

Boot loaders such as for example U-Boot for Linux-based embedded systems also support secure boot in some variants. The Linux kernel is also able to check the integrity (correctness, intactness) of kernel modules and only load correctly signed kernel modules.

Various types of integrity of messages, processes or programs that are able to be checked in terms of information security are possible:
- correct content
- unmodified state
- detection of modification if undesired modifications are able to be prevented
- temporal correctness: relevant time conditions, such as for instance sequences or maximum delay times, should be complied with.

The restriction of secure boot through license conditions is known, specifically in the case of GPL licenses.

The resultant problem is also known under the term tivoization.

"Tivoization" describes the process in which free software is used on devices on which only software signed by the manufacturer is able to run. The user, in accordance with the license, does then have the right to receive the source code and to change it according to his requirements, but not the technical possibility of running the software that he has changed on the device of the manufacturer. In accordance with particular license conditions, it may be necessary for the manufacturer to provide the source code or even to issue the cryptographic keys or access codes. In the case of secure boot, this would jeopardize the security and integrity of such embedded systems.

There is a need to protect the integrity of an (industrial) control system, and nevertheless to give a user the freedom possibly to be able to use modified software or firmware on this device. The security of an industrial automation and control system should however not be jeopardized thereby.

SUMMARY

An aspect relates to, when providing an open environment for user-specific application software, nevertheless providing security measures and protective measures for an embedded system.

The embodiments of the invention include a device unit, in particular an embedded device unit, comprising a module that is able to configure the device unit with one operating state from various operating states when the device unit is booted and/or during ongoing operation of the device unit. The module may in this case be designed in the form of hardware and/or firmware and/or software.

A first protected operating state of the various operating states is in this case designed to permit the loading and/or execution of at least one predeterminable operating procedure and to protect the predeterminable operating procedure, possibly using defined cryptographic means. In this case, the predeterminable operating procedure may be implemented by one or more program codes or else be designed as such a module. At least one second operating state of the various operating states is designed to deactivate the first protected operating state and to permit or to enable at least one other changeable operating procedure (likewise able to be implemented in program code(s)/module), and to protect it, possibly using predefinable cryptographic means. If the configured operating state corresponds to the first operating state, then the module maintains this state, or if the configured operating state corresponds to the at least second operating state, the module deactivates the first operating state and maintains or introduces the at least second operating state.

The deactivation may be irrevocable. Defined cryptographic means should in this case be understood to mean that manufacturer-side updates are possible, for example by way of a firmware update, but no changes are able to be performed on the user side, and these changes are thus prescribed or preconfigured or defined for the user.

In the case of a boot procedure, the following starting operating states are conceivable:

1. A type of neutral operating state that is assumed only during the boot procedure. The module may then configure the device unit such that, following the boot procedure, the first or the second operating state is introduced or assumed during ongoing operation.

2. The device unit boots in the first operating state, and the first operating state may then be maintained in the configuration or the second operating state is switched to in the configuration, and the operating state that is now configured then corresponds to the second operating state, the first operating state then being deactivated.

3. The device unit boots in the second operating state, and the second operating state is then maintained in the configuration. The configured operating state accordingly corresponds to the second operating state, wherein the first operating state is nevertheless deactivated in order to prevent a "return" to the first operating state.

The first operating state normally corresponds to an operating state preconfigured by a device manufacturer, and the second operating state corresponds to an operating state able to be configured by a user.

The cryptographic means may be for example a device configuration or protective means such as keys (from the device manufacturer), certificates, etc.

One development of the embodiments of the invention makes provision for the device unit to be designed as an embedded system or as part of an embedded system.

One development of the embodiments of the invention makes provision, on the device side, when the operating state is intended to be protected during the boot procedure and/or during ongoing operation of the device unit, for integrity protection measures suitable for booting and/or suitable for ongoing operation to be provided or to be able to be provided.

Integrity protection measures in the boot procedure may be for example a cryptographically protected file system or cryptographically protected configuration data in EEPROM. Integrity protection measures with regard to the runtime may be for example process monitoring or a host-based intrusion detection system.

One development of the embodiments of the invention makes provision, in the protected operating state, for the integrity protection measures to furthermore comprise device authentication and/or device integrity attestation.

One development of the embodiments of the invention makes provision, depending on the operating state, for at least one key for the integrity protection measures or to be able to be provided on the device side or by a user.

One development of the embodiments of the invention makes provision for in each case a device certificate for both operating states to be able to be made available.

Furthermore, depending on the operating state, a private or secret device authentication key may be provided.

One development of the embodiments of the invention makes provision for the deactivation of the protected operating state to be able to be performed by deleting the at least one key and/or revoking the device certificate made available for the protected operating state. The certificate may possibly be reproduced by what is known as a certification authority (CA).

One development of the embodiments of the invention makes provision for parts of the device unit to be able to be activated and/or able to be deactivated. Depending on the operating state, in addition to the software-based functions, a hardware-based function of the device may also be activated or deactivated or configured. To this end, for example a trust anchor, a hardware-based device integrity monitoring system or an integrity watchdog, a hardware-based self-test function, a self-monitoring sensor, a tamper sensor for detecting manipulations or a communication unit that provides for example an integrity confirmation signal, may be used.

One development of the embodiments of the invention makes provision for the module to be able to be configured by way of one or more software and/or firmware program codes and/or hardware circuits.

One development of the embodiments of the invention makes provision for the one or more software and/or firmware program codes to be able to be sealed. The sealing may be performed by way of a hash value or by way of a value from a reference database.

One development of the embodiments of the invention makes provision for at least one further third operating state of the device unit to be designed to permit the first and the second operating state in parallel operation and possibly to cryptographically protect them.

One development of the embodiments of the invention makes provision for the first, second and possibly the third operating state to be able to be defined by device configuration, what are known as jumpers, activation codes and/or by the key and/or by the device certificate and/or the revocation state of the device certificate and/or by a trust anchor and/or by a communication protocol with a further authority.

A further aspect of the embodiments of the invention provides a method for operating a device unit in one operating state from various operating states when the device unit is booted and/or during ongoing operation of the device unit, wherein, in a first protected operating state, the (loading and/or) execution of at least one predeterminable operating procedure is permitted and possibly protected using defined cryptographic means and wherein, in a further second operating state, the first protected operating state is deactivated and at least one other changeable operating procedure is permitted and possibly protected using predefinable cryptographic means, wherein the operating state is configured or determined before and/or during the boot procedure and/or the ongoing operation and, if the configured operating state corresponds to the first operating state, so as then to maintain this state, or if the configured operating state corresponds to the at least second operating state, so as to deactivate the first operating state (possibly irrevocably) and to introduce and/or maintain the at least second operating state.

The method may be designed or developed in accordance with the embodiments/developments in relation to the abovementioned device unit.

A further aspect of the embodiments of the invention is a computer program product (non-transitory computer readable storage medium having instructions, which when executed by a processor, perform actions) containing at least one computer program that has means for performing the method as claimed in one of the above method claims when the at least one computer program is able to be loaded into the memory of a device unit and its embodiments and is executed.

The computer program (product) may accordingly be designed and developed in substantially the same way as the method and its refinements or developments.

BRIEF DESCRIPTION

Some of the embodiments will be described in detail, with references to the following Figures, wherein like designations denote like members, wherein:

FIG. 1 shows a device unit, preferably an embedded device unit,

FIG. 2 schematically shows a flowchart of which steps are able to be executed on the device unit.

DETAILED DESCRIPTION

FIG. 1 shows a device unit GE, which may be designed as a device or integrated into a device. In the following exemplary embodiment, the device unit GE is for a Linux-based embedded device, preferably a field device or what is known as an IoT device. It is able to execute a plurality of applications, for example A1, A2. A control algorithm DMA (device management agent) and/or a BIST (built-in self-test) may additionally be executed. Hardware-based based or firmware-based or software-based modules, such as a mandatory access control module MAC and a runtime integrity monitor module RIM, generally run in the kernel K, in the example a Linux kernel. A hardware-based or firmware-based or software-based key module KM for storing and managing cryptographic keys, a hardware-based or firmware-based or software-based integrity monitoring module I (integrity watchdog) and a hardware-based or firmware-based or software-based device mode manager are also present on the device unit. A hardware-based, firmware-based and/or software-based module M, also called device mode manager, is able to configure and/or operate the device unit in at least two various operating states or operating modes. The device unit is able to be operated in a first what is known as "closed mode" operating mode or second what is known as "open mode" operating mode or in a further third hybrid operating mode, that is to say a kind of combination of the two abovementioned operating modes "open mode" and "closed mode". The decision as to which operating mode should be introduced or should run is preferably made when the system is started (also called booting). The modules device key manager KM, integrity watchdog I, runtime integrity monitor RIM, mandatory access control module MAC and the self-test BIST are configured by the module M (device mode manager) depending on the activated operating mode of the device unit.

The module M, depending on the current operating mode, may provide a cryptographically protected item of attestation information that specifies the operating mode. The self-test BIST, in particular including file system integrity verification, monitor RIM, mandatory access control module MAC and integrity watchdog, are active depending on the operating mode or use a rule (policy) dependent on the operating mode. The module KM (device key manager) is able to block or delete the key depending on the operating mode.

FIG. 2 shows a flowchart, the individual steps of which are referenced S1 to S7.

When the system is started S1 or in the boot procedure, the operating mode is determined or selected (S2). If the operating mode in step S3 is "closed mode", then the runtime integrity check is performed in step S4. Access to the attestation key for the device integrity is granted in step S5. If the operating mode in step S3 is not "closed mode", then there is a transition into ongoing operation in step S6, wherein the "end" in step S7 symbolically describes the end of the described procedure and does not have to mean the end of ongoing operation.

Further embodiments are described below:

Embedded systems, such as for example the device unit GE illustrated above, in particular for critical industrial control systems, often have integrated protective functions/means in order to prevent the execution of manipulated source code (also called secure boot) or detect same (also called runtime integrity check).

Such functions would however also prevent a user from being able to execute software intentionally changed by him on such a device. According to the embodiments of the invention, a configurable device unit having two operating modes is accordingly used, the configuration being able to be software-based.

In a first operating mode, called "closed mode", only software or firmware that has been authorized by the device manufacturer is able to be executed. For this purpose, the software usually has a digital signature that is able to be verified on the device using a public manufacturer key (platform key).

In what is known as the "closed mode", runtime integrity checks are also active. These are able to monitor, for the runtime, that only permitted software (processes) or operating procedures are executed, and that device configuration or protective means such as keys, certificates, etc. are unchanged and unchangeable.

In a second operating mode, called "open mode", a user is able to load and execute his own software or changed software. To this end, he is able to deactivate the first operating mode or set up another platform key.

In the "closed mode", the device unit preferably has an integrity confirmation function that provides a cryptographically protected item of device integrity information via a communication interface, for example an item of device authentication function or an item of device integrity attestation information.

In the "open mode", on the other hand, no item of device integrity information or another item of device integrity information is provided on the device side.

The operating mode (open or closed) may for example be explicitly coded into the integrity confirmation function, for example in the form of a flag. A key for forming the cryptographic item of device integrity information may be selected or granted depending on the operating mode. There may thus be two integrity confirmation keys; a device manufacturer integrity confirmation key and a user-definable integrity confirmation key.

The abovementioned hardware or software or firmware module M, which decides between "closed mode" (closed or protected operating mode) and "open mode" (open operating mode) and detects the possibly coded-in operating mode, is thus intended to be designed such that it is not subject to the GPL license or a similar license as described at the outset. In addition, the module (M) must not be changeable, that is to say it has to be secured using integrity protection measures (for example secure boot).

In one embodiment, cryptographic keys that are used for device integrity protection purposes in the "closed mode" are deleted, or permanently or temporarily blocked, when the "open mode" is activated or introduced. In a further embodiment, a request for certificate revocation is generated by the device unit when the "open mode" is activated and possibly transmitted to a third authority, for example a certificate authority.

In a further embodiment, the device checks its own device certificate (device manufacturer certificate). This certificate may contain an item of information, for example in the form of an X.509v3 expansion or of the device identifier, as to whether the device certificate is intended for "closed mode" or "open mode". In a further embodiment, the module (M) activates the operating mode (open, closed) depending on the configured device certificate. This has the advantage that known technologies and processes for issuing and distributing certificates are able to be used in order to unlock a device for an "open mode". In a further embodiment, the device unit selects one of a plurality of configured device certificates for use during operation depending on the operating mode.

In a further embodiment, the device checks whether its own manufacturer device certificate has been revoked or deleted (for example using a certificate revocation list (CRL) or a certificate status response (OCSP response)).

The device unit allows activation of the "open mode" if the device manufacturer certificate assigned to the "closed mode" has been rescinded or revoked. This has the advantage that known technologies and processes for certificate revocation are able to be used in order to unlock a device for an "open mode".

Furthermore, depending on the "open"/"closed" operating mode, in addition to software-based functions, a hardware-based function of the device may also be activated or deactivated or configured (for example a trust anchor, a hardware-based device integrity monitoring system, for example RIM or integrity watchdog I, a hardware-based self-test function, a self-monitoring sensor, a tamper sensor for detecting manipulations or a communication unit that provides for example an integrity confirmation signal).

In the abovementioned step S2, the operating mode may be determined or configured and then possibly maintained, defined or selected in various ways:
device configuration settings (for example UEFI BIOS), device configuration)
what are known as jumpers
inputting of an unlock code in order to activate the "open mode"
implicitly via the firmware signature (the closed mode is activated upon loading or starting firmware signed with a device manufacturer key, otherwise open mode is started)
implicitly via the configured device certificate
through the abovementioned revocation status of a device certificate
through the state of a trust anchor installed in the system
through a handling protocol with a third authority, for example a remote server In one embodiment, the device unit supports a further third operating mode, which simultaneously permits the two first and second operating modes, called "combined mode". To this end, for example two CPU/SoCs (one-chip system) may be provided, or two separate execution environments may be provided on shared-use hardware by way of a hypervisor. This "combined mode" may constitute a third configurable or determinable or selectable operating mode, or may be provided permanently as a single combined operating mode.

In the "combined mode", the device has two execution environments, a "closed mode" execution environment (operating mode) and an "open mode" execution environment. For the "open mode" execution environment, a user is able to load and execute his own software or changed software (for example for the operating or execution time, when the system is started, or when a firmware update is brought in). By contrast, for the "closed mode" execution environment, only authorized applications, that is to say applications signed by way of a device manufacturer-certified software signature key, are able to be loaded. Secure boot and runtime integrity monitoring are active for the "closed mode" execution environment, that is to say for those parts of the software signed by the manufacturer. That is to say, only the "closed mode" execution environment is covered by the device integrity protective functions.

In a further embodiment, the device supports sealing of loaded user software (in the "open mode" of the device unit or for the "open mode" execution environment). In this case, an additional device integrity protective function for the "open mode" is provided, in addition to the device integrity protective function for the "closed mode". In this case, a user is able to load software for the "open mode" under his own control. By "sealing" the device unit configuration, this software state, loaded by the user, is frozen. In this case, the reference information for the runtime integrity protection of the device unit (secure boot, runtime integrity monitor RIM) is "learned".

In the case of a secure boot taking place in the sealed state, it is verified that the software state of the "open mode" recorded during sealing is loaded. To this end, for example, a hash value of the software state may be recorded during sealing and checked when the system is next started, or the user software may be signed with a device key by the device unit. Furthermore, for runtime integrity monitoring RIM, the software loaded by the user may be recorded in the reference database (using what are known as "white" or "black" lists) when the device is sealed.

Although the embodiments of the invention have been described and illustrated in more detail through the preferred exemplary embodiment, the invention is not restricted by the disclosed examples, and other variations may be derived therefrom by a person skilled in the art without departing from the scope of protection of the embodiments of the invention.

The processes or method sequences described above may be implemented using instructions that are present on computer-readable storage media or in volatile computer memories (referred to below collectively as computer-readable memories). Computer-readable memories are for example volatile memories such as caches, buffers or RAM, and non-volatile memories, such as changeable data carriers, hard disks, etc.

The functions or steps described above may in this case be present in the form of at least one set of instructions in/on a computer-readable memory. The functions or steps are in this case not bound to a particular set of instructions or to a particular form of sets of instructions or to a particular storage medium or to a particular processor or to particular execution schemes, and may be executed by software, firmware, microcode, hardware, processors, integrated circuits etc. operating on their own or in any desired combination. In this case, a wide variety of processing strategies may be used, for example serial processing by an individual processor or multiprocessing or multitasking or parallel processing, etc.

The instructions may be stored in local memories, but it is also possible to store the instructions on a remote system and access them via a network.

The term "processor", "central signal processing", "control unit" or "data evaluation means", as used here, comprises processing means in the broadest sense, that is to say for example servers, universal processors, graphic processors, digital signal processors, application-specific integrated circuits (ASICs), programmable logic circuits, such as FPGAs, discrete analog or digital circuits and any desired combinations thereof, including all other processing means known to a person skilled in the art or developed in the future. Processors may in this case consist of one or more devices or apparatuses or units. If a processor consists of a plurality of devices, these may be designed or configured for the parallel or sequential processing or execution of instructions.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A device unit comprising a module that configures the device unit with one operating state from various operating states when the device unit is booted and/or during ongoing operation of the device unit;
   wherein a first protected operating state of the various operating states is designed to permit an execution of at least one predeterminable operating procedure and to protect it, using defined cryptographic means,
   wherein a second operating state of the various operating states is designed to permit at least one changeable operating procedure and to protect it, using predefinable cryptographic means,
   wherein when the operating state is intended to be protected during a boot procedure and/or during ongoing operation of the device unit, integrity protection measures for booting and for ongoing operation are provided by the module, the integrity protection measures comprise device authentication and device integrity attestation;
   wherein the module is able to freeze a software state loaded by the user that is not authorized by the device manufacturer, wherein the software state loaded by the user is recorded in a reference database during the freeze; and
   wherein a third operating state of the device unit is designed to simultaneously permit the first and the second operating states executing simultaneously in a combined mode.

2. The device unit as claimed in claim 1, wherein the device unit is an embedded system.

3. The device unit as claimed in claim 1, wherein, depending on the operating state, at least one key for the integrity protection measures is able to be provided on the device side or by a user.

4. The device unit as claimed in claim 3, wherein device certificate for both the first protected operating state and the second operating state is made available by the module.

5. The device unit as claimed in claim 4, wherein the deactivation of the first protected operating state is able to be performed by deleting the at least one key and/or revoking the device certificate made available for the first protected operating state.

6. The device unit as claimed in claim 1, wherein the device unit is able to be activated and/or able to be deactivated.

7. The device unit as claimed in 1, wherein the first protected operating state, and the second and third operating states are each defined in at least one way selected from the group consisting of: device configuration settings, jumpers, activation codes, a device manufacturer key, the device certificate, a revocation state of the device certificate, a trust anchor, and a communication protocol with a further authority.

8. A method for operating a device unit in one operating state from various operating states when the device unit is booted and/or during ongoing operation of the device unit,
   wherein, in a first protected operating state, the execution of at least one predeterminable operating procedure is permitted and protected using defined cryptographic means and
   wherein, in a second operating state, the first protected operating state is deactivated and at least one changeable operating procedure is permitted and protected using predefinable cryptographic means, wherein the operating state is configured before and/or during the boot procedure and/or the ongoing operation and, if the configured operating state corresponds to the first operating state, so as then to maintain this state, or if the configured operating state corresponds to the second operating state, so as to deactivate the first operating state and to introduce and/or maintain the second operating state;
   wherein, on a device side, when the operating state is intended to be protected during a boot procedure and/or during ongoing operation of the device unit, integrity protection measures suitable for booting and/or suitable for ongoing operation are provided, the integrity protection measures comprise device authentication and/or device integrity attestation;
   wherein the module is able to freeze a software state loaded by the user that is not authorized by the device manufacturer, wherein the software state loaded by the user is recorded in a reference database during the freeze; and
   wherein a third operating state of the device unit simultaneously permits the first and the second operating states executing simultaneously in a combined mode.

9. The method as claimed in claim 8, wherein at least one key for the integrity protection measures is provided depending on the operating state.

10. The method as claimed in claim 9, wherein a device certificate for both the first protected operating state and the second operating state is made available by the module.

11. The method as claimed in claim 10, wherein the deactivation of the first protected operating state is performed by deleting the at least one key and/or revoking the device certificate made available for the first protected operating state.

12. The method as claimed in method claim 8, wherein the first protected operating state, and the second and third operating systems are each defined in at least one way selected from the group consisting of: device configuration settings, jumpers, activation codes, a device manufacturer, the device certificate, a revocation state of the device certificate, a trust anchor, and a communication protocol with a further authority.

13. A computer program product, comprising a computer readable hardware storage device having computer readable program code stored therein, said program code executable by a processor of a computer system to implement a method, as claimed in claim 8.

\* \* \* \* \*